(12) United States Patent
Lee et al.

(10) Patent No.: US 12,697,846 B2
(45) Date of Patent: Aug. 4, 2026

(54) AIR FILTER FOR AIR SUSPENSION

(71) Applicant: HYUNDAI MOBIS CO., LTD., Seoul (KR)

(72) Inventors: Jong Woo Lee, Yongin-si (KR); Sang Hoon Baik, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 490 days.

(21) Appl. No.: 18/233,188

(22) Filed: Aug. 11, 2023

(65) Prior Publication Data

US 2024/0059114 A1    Feb. 22, 2024

(30) Foreign Application Priority Data

Aug. 18, 2022    (KR) ......................... 10-2022-0103312

(51) Int. Cl.
B60G 11/26        (2006.01)

(52) U.S. Cl.
CPC .......... B60G 11/26 (2013.01); *B60G 2600/44* (2013.01); *B60G 2600/68* (2013.01); *B60G 2800/914* (2013.01)

(58) Field of Classification Search
CPC ........................... B60G 11/26; B60G 2600/44; B60G 2600/68; B60G 2800/914; B60G 17/0408; B60G 17/052; B60Y 2306/09; B60Y 2410/10
See application file for complete search history.

(56) References Cited

U.S. PATENT DOCUMENTS

2002/0096841 A1*  7/2002  Hedenberg ............. B60G 17/08
                                                     280/124.157
2011/0101578 A1*  5/2011  Ji .......................... F16F 13/002
                                                     267/64.15

FOREIGN PATENT DOCUMENTS

KR      10-2013-0005358 A      1/2013

OTHER PUBLICATIONS

British Patent No. GB 2406548 to Harrison published on Apr. 6, 2005.*
Korean Patent No. KR 20170114478 published on Oct. 16, 2017 obtained from website: https://worldwide.espacenet.com.*
Description Translation of KR 20170114478 obtained from website: https://worldwide.espacenet.com on Jan. 26, 2026.*
Chinese Patent No. CN 111469619 published on Jul. 31, 2020 obtained from website: https://worldwide.espacenet.com.*
Description Translation of Chinese Patent No. CN 111469619 obtained from website: https://worldwide.espacenet.com on Jan. 26, 2026.*
Chinese Patent No. CN 216342694 to Jiang published on Apr. 19, 2022.*
Japanese Patent No. JP 5945793 to Fukuhara published on Jul. 5, 2016.*
(Continued)

*Primary Examiner* — Pamela Rodriguez
(74) *Attorney, Agent, or Firm* — Morgan, Lewis & Bockius LLP

(57) ABSTRACT

An air filter for an air suspension. A housing part is mounted on a vehicle body, connected to a height control part that controls the height of a vehicle, and allows fluid to pass therethrough. A filter part is disposed inside the housing part to remove foreign matter from the fluid. One or more noise reducing parts are disposed inside the housing part to reduce a movement speed of the fluid and reduce noise.

18 Claims, 6 Drawing Sheets

1

(56)          References Cited

OTHER PUBLICATIONS

Description Translation of Japanese Patent No. JP 5945793 obtained
from website: https://worldwide.espacenet.com on Jan. 26, 2026.*
Chinese Patent No. CN 116123059 to Mo et al published on May
16, 2023.*

\* cited by examiner

AIR FILTER FOR AIR SUSPENSION

This application claims priority from and the benefit of Korean Patent Application No. 10-2022-0103312, filed on Aug. 18, 2022, which are hereby incorporated by reference for all purposes as if set forth herein.

BACKGROUND

Field

Exemplary embodiments of the present disclosure relate to an air filter for an air suspension, and more particularly, to an air filter for an air suspension, the air filter being configured to remove foreign matter from fluid entering from the outside and reduce noise generated during flowing of the fluid.

Discussion of the Background

In general, a suspension system used in a vehicle serves to improve ride quality and protect the vehicle body by absorbing shocks transmitted from the road surface to the vehicle body through the tires and the axle while the vehicle is driving.

That is, the suspension system is configured to control vibrations or shocks received from the road surface while the vehicle is driving so that vibrations or shocks are not directly transmitted to the vehicle body, thereby preventing injury to passengers and damage to the vehicle body, cargo, etc. and improving the ride quality of the vehicle.

Typically, suspension systems have limitations in satisfying ride quality and handling stability at the same time. When the ride quality is improved, the handling stability is decreased, and when the handling stability is improved, the ride quality is reduced.

For example, when the spring of the suspension system is softened, shocks caused by a bumpy road surface are easily absorbed and thus the ride quality is improved, but the vehicle body is unstable and the handling stability is decreased.

In contrast, when the spring is hard, the handling stability is improved. However, shocks transmitted from the bumpy road surface are not properly absorbed, and thus the ride quality is reduced.

In this regard, recent vehicles are generally provided with an air strut to which an air suspension using air is applied.

The air strut of the air suspension may be hardened or softened as required by easily controlling the air pressure and the damping force of a damper. The air strut of the air suspension has advantages in effectively ensuring ride quality and handling stability. Such air struts of the air suspension are generally mounted on both the front and rear wheels but may be mounted only on the front or rear wheels depending on the design specification.

In addition, in the related art, there has been a problem that noise is generated when external air is supplied to the air suspension through an air filter or when air from the air suspension is discharged to the outside through the air filter. Therefore, there is a need to solve this problem.

The background technology of the present disclosure is disclosed in Korean Patent Application Publication No. 10-2013-0005358 (published on Jan. 16, 2013 and entitled 'Air Strut of Air Suspension of Vehicle').

SUMMARY

Various embodiments are directed to an air filter for an air suspension, the air filter being configured to remove foreign matter from fluid entering from the outside and reduce noise generated during flowing of the fluid.

In an embodiment, an air filter for an air suspension may include: a housing part configured to be mounted on a vehicle body, connected to a height control part that controls a height of a vehicle, and allowing fluid to pass therethrough; a filter part disposed inside the housing part to remove foreign matter from the fluid; and one or more noise reducing parts disposed inside the housing part to reduce a movement speed of the fluid and reduce noise.

The housing part may include: a first housing part having one open side, allowing the filter part 20 and the one or more noise reducing parts to be disposed therein, and allowing the fluid to pass therethrough; a second housing part coupled to the first housing part to cover one side of the first housing part and connected to the height control part.

The first housing part may include: a first duct portion having a duct shape and one end being coupled to the second housing part; a first cover portion covering the other end of the first duct portion; a first passage portion in the first cover portion to guide the fluid; and a first guide portion in at least one of the first duct portion and the first cover portion to guide mounting of the filter part and the one or more noise reducing parts.

The first passage portion may be configured to guide ambient air to the first duct portion or guide air from the first duct portion to outside.

The first guide portion may include one or more filter guide portions protruding from an inner portion of at least one of the first duct portion and the first cover portion to guide seating of the filter part.

The filter guide portions may be configured to protrude from or be depressed into inner surfaces of the first duct portion and the first cover portion.

The filter guide portions may include: a plurality of first filter guide portions radially protruding from inner portions of the first cover portion to support the filter part; and a plurality of second filter guide portions radially protruding from inner portions of the first duct portion to support the filter part.

The filter part may include: a disk-shaped first filter portion configured to be seated on the first filter guide portions; a second filter portion bent from a peripheral portion of the first filter portion to be in contact with the second filter guide portions; and a third filter portion interposed between the first filter portion and the second filter portion to remove foreign matter from air passing therethrough.

The first guide portion may include: a noise reducer seating portion protruding from an inner portion of the first duct portion and allowing the one or more noise reducing parts to be seated thereon; and a noise reducer insertion portion depressed into the first duct portion to guide insertion of the one or more noise reducing parts.

The first duct portion may include: a duct filter portion allowing the filter part to be disposed therein; and a duct noise reducer portion extending from the duct filter portion and allowing the one or more noise reducing parts to be disposed therein.

An inner diameter of the duct filter portion may be smaller than that of the duct noise reducer portion, whereby the noise reducer seating portion is defined by a stepped profile between the duct filter portion and the duct noise reducer portion.

The noise reducer insertion portion may be along a longitudinal direction of the duct noise reducer portion to guide the one or more noise reducing parts to positions at which the one or more noise reducing parts are supposed to be inserted.

Each of the one or more noise reducing parts may include: a reducer duct portion configured to be in close contact with an inner portion of the housing part; a reducer cover portion covering a central portion of the reducer duct portion; and a reducer passage portion extending through the reducer cover portion to allow the fluid to pass therethrough.

The reducer duct portion may include reducer protrusion portions on an outer portion of the reducer duct portion, the reducer protrusion portions being configured to be inserted into and movable in the housing part.

Two or more of the noise reducing parts may be arranged in line, and the reducer passage portions in the two or more noise reducing parts, respectively, are disposed in a staggered arrangement.

In an embodiment, an air filter for an air suspension may include: a housing part configured to be mounted on a vehicle body, connected to a height control part that controls a height of a vehicle, and allowing fluid to pass therethrough; a filter part disposed inside the housing part to remove foreign matter from the fluid; and noise reducing parts disposed inside the housing part and including a first noise reducing portion, a second noise reducing portion, and a third noise reducing portion arranged in line to reduce a movement speed of the fluid and reduce noise.

The first noise reducing portion may include: a first noise reducer duct portion configured to be in close contact with an inner portion of the housing part; a first noise reducer cover portion covering a central portion of the first noise reducer duct portion; and a first noise reducer passage portion extending through the first noise reducer cover portion to allow the fluid to pass therethrough.

The second noise reducing portion may include: a second noise reducer duct portion configured to be in close contact with the inner portion of the housing part; a second noise reducer cover portion covering a central portion of the second noise reducer duct portion; and a second noise reducer passage portion extending through the second noise reducer cover portion to allow the fluid to pass therethrough.

The third noise reducing portion may include: a third noise reducer duct portion configured to be in close contact with the inner portion of the housing part; a third noise reducer cover portion covering a central portion of the third noise reducer duct portion; and a third noise reducer passage portion extending through the third noise reducer cover portion to allow the fluid to pass therethrough.

The first noise reducer passage portion may be in a central portion of the first noise reducer cover portion, the second noise reducer passage portion may be located at 12 o'clock with respect to a central portion of the second noise reducer cover portion, and the third noise reducer passage portion may be located at 6 o'clock with respect to a central portion of the third noise reducer cover portion.

In the air filter for an air suspension according to the present disclosure, the filter part and the noise reducing part are disposed inside the housing part. Thus, it is possible to remove foreign matter from the air used in the height control part and to reduce noise. In addition, since the filter part and the noise reducing part are disposed inside the housing part, the filter part, the noise reducing part, and the housing part may be fabricated as a single module, thereby reducing space in a vehicle body occupied thereby.

DETAILED DESCRIPTION OF THE ILLUSTRATED EMBODIMENTS

Figure 1:
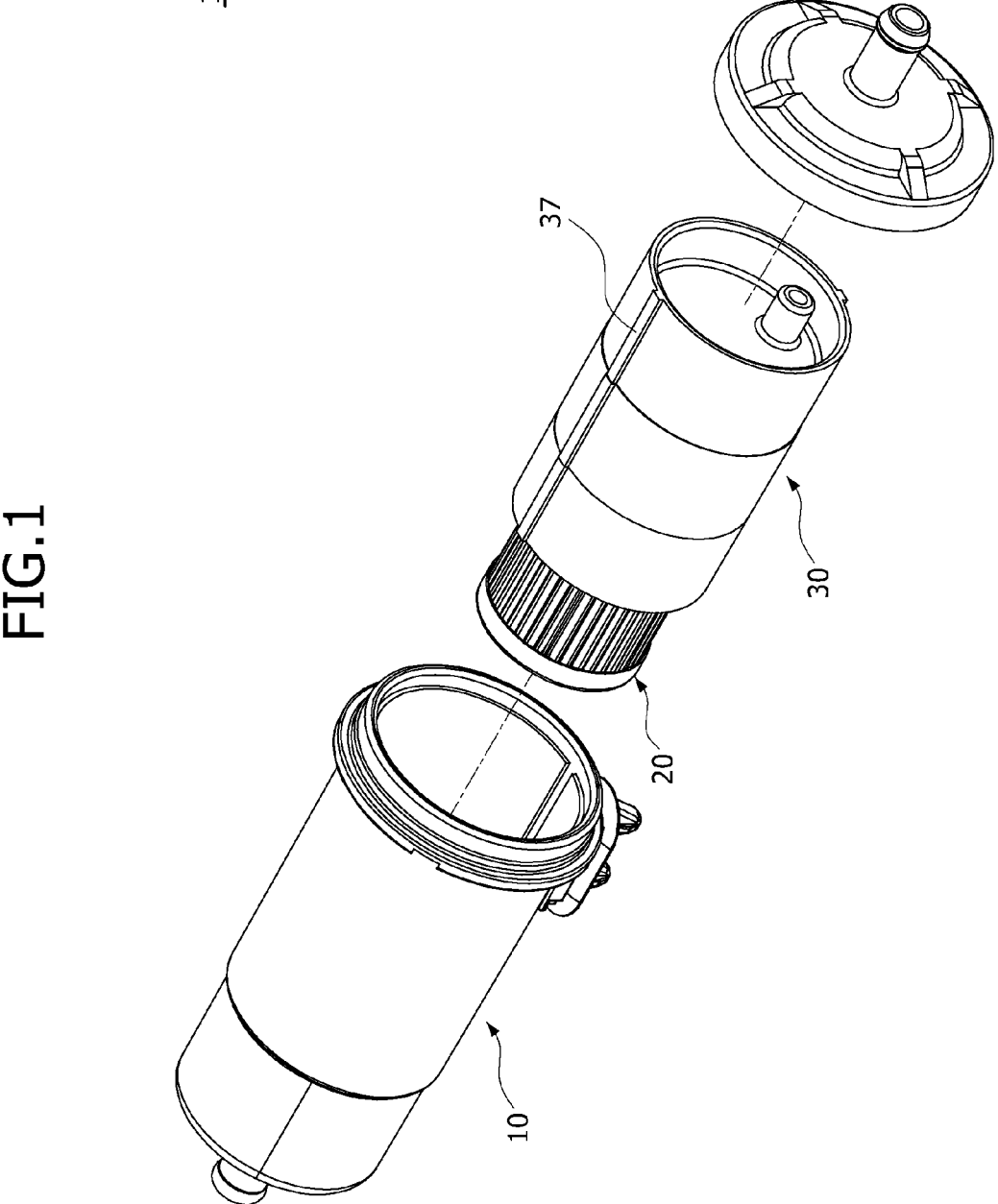
FIG. 1 is an exploded perspective view schematically illustrating an air filter for an air suspension according to an embodiment of the present disclosure.

Hereinafter, an air filter for an air suspension will be described below with reference to the accompanying drawings through various exemplary embodiments. Here, the thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, the definition of the terms should be made based on the entire contents of the present specification.

Figure 2:
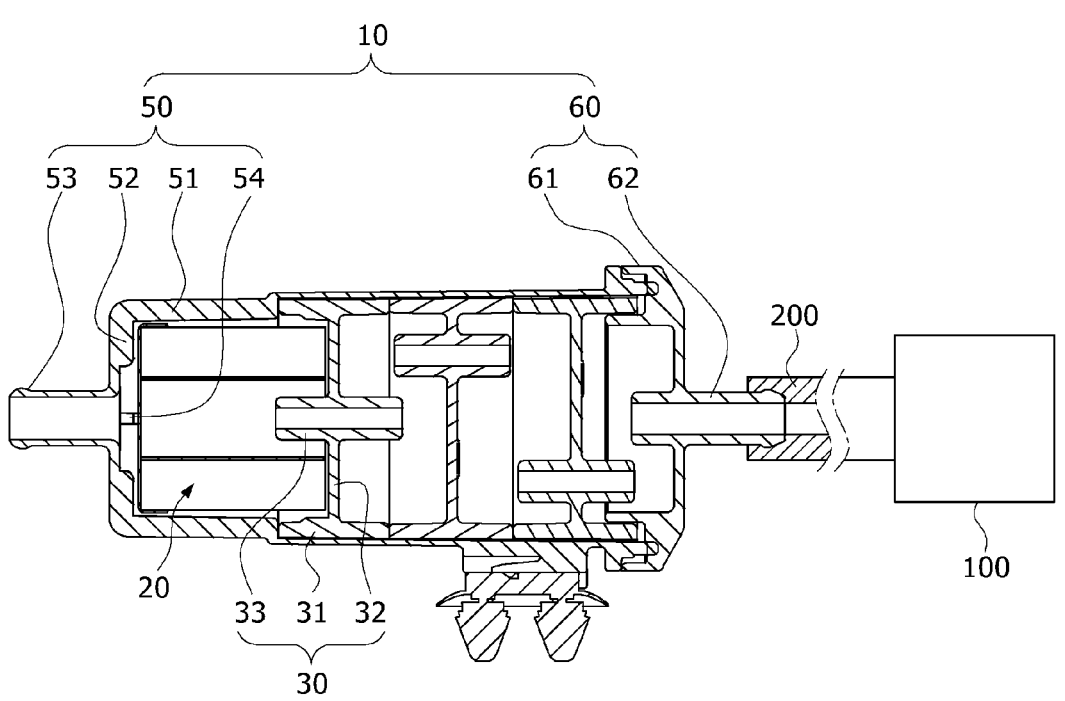
FIG. 2 is an assembled cross-sectional view schematically illustrating the air filter for an air suspension according to an embodiment of the present disclosure.

FIG. 1 is an exploded perspective view schematically illustrating an air filter for an air suspension according to an embodiment of the present disclosure, and FIG. 2 is an assembled cross-sectional view schematically illustrating the air filter for an air suspension according to an embodiment of the present disclosure. Referring to FIGS. 1 and 2, an air filter 1 for an air suspension according to an embodiment of the present disclosure includes a housing part 10, a filter part 20, and noise reducing parts 30.

The housing part 10 may be mounted on a vehicle body, connected to a height control part 100 that controls the height of a vehicle, and configured to allow fluid to pass therethrough. For example, the housing part 10 may be configured such that the right end is connected to the height control part 100 through a hose 200 and the left end is exposed to the outside. Thus, the ambient air may enter the height control part 100 through the housing part 10 or the air inside the height control part 100 may be discharged to the outside through the housing part 10.

The filter part 20 may be disposed inside the housing part 10 to remove foreign matter from the fluid. For example, the filter part 20 may be disposed in the left end portion of the housing part 10 to remove foreign matter from the air introduced from the outside (see FIG. 2).

One or more noise reducing parts 30 may be disposed inside the housing part 10 to reduce noise by reducing fluid movement speed. For example, three noise reducing parts 30 may be disposed side by side to the right of the filter part 20. As the air sequentially passes through these noise reducing parts 30, noise may be reduced.

Figure 3:
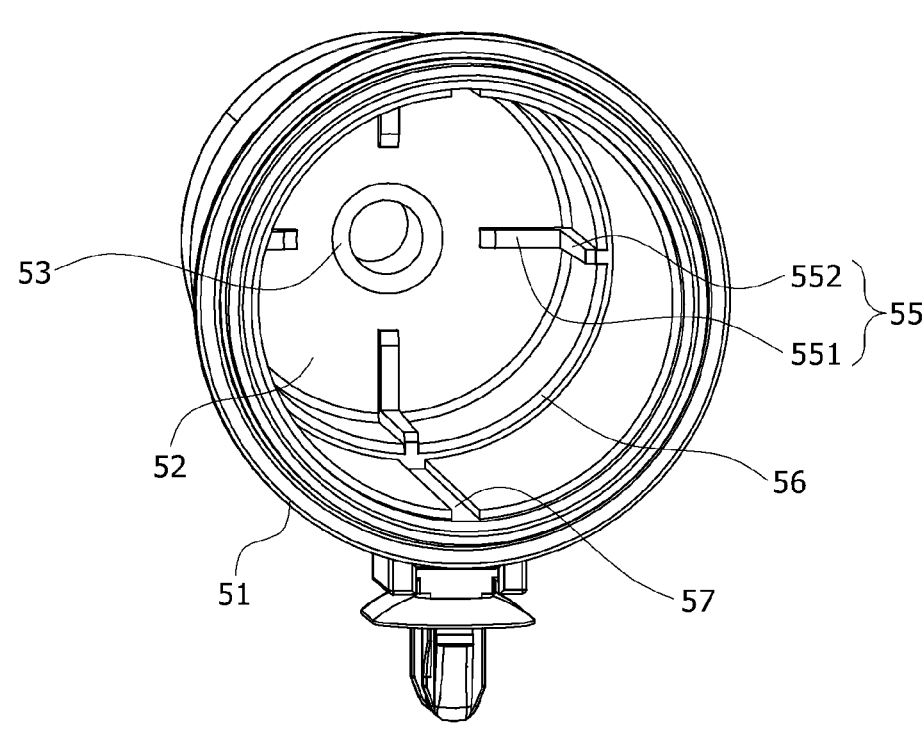
FIG. 3 is a perspective view schematically illustrating the inside of the housing part according to an embodiment of the present disclosure.

FIG. 3 is a perspective view schematically illustrating the inside of the housing part according to an embodiment of the present disclosure. Referring to FIGS. 1 to 3, the housing part 10 may include a first housing part 50 and a second housing part 60.

The first housing part 50 may have one open side, allowing the filter part 20 and the noise reducing parts 30 to be disposed therein, and allowing the fluid to pass therethrough. For example, the right end of the housing part 50 may be opened such that the filter part 20 and the noise reducing parts 30 may be sequentially inserted therethrough.

The second housing part 60 may be coupled to the first housing part 50 to cover one side of the first housing part 50, and may be connected to the height control part 100. For example, the second housing part 60 may include a second cover portion 61 covering the opened right side of the first housing part 50 and coupled to the first housing part 50 and a second passage portion 62 communicating with the second cover portion 61 and connected to the hose 200 to guide the air.

In addition, the first housing part 50 according to an embodiment of the present disclosure may include a first duct portion 51, a first cover portion 52, a first passage portion 53, and a first guide portion 54.

The first duct portion 51 has the shape of a duct, with one end thereof being coupled to the second housing part 60. For example, the right end of the first duct portion 51 may have threads to be engaged with the second cover portion 61. In addition, the first duct portion 51 may be coupled to the second cover portion 61 in a variety of other manners.

The first cover portion 52 may cover the other end of the first duct portion 51. For example, the first cover portion 52 may be formed integrally with the first duct portion 51 and be configured to cover the left end of the first duct portion 51.

The first passage portion 53 may be formed in the first cover portion 52 to guide the fluid. For example, the first passage portion 53 may be formed integrally with the first cover portion 52 and be configured to communicate with the first duct portion 51. The first passage portion 53 may guide the ambient air to the first duct portion 51 or guide the air from the first duct portion 51 to the outside.

The first guide portion 54 may be formed in at least one of the first duct portion 51 and the first cover portion 52, and may guide mounting of the filter part 20 and the noise reducing parts 30. For example, the first guide portion 54 may be configured to protrude from or be depressed into the inner surfaces of the first duct portion 51 and the first cover portion 52.

Figure 4:
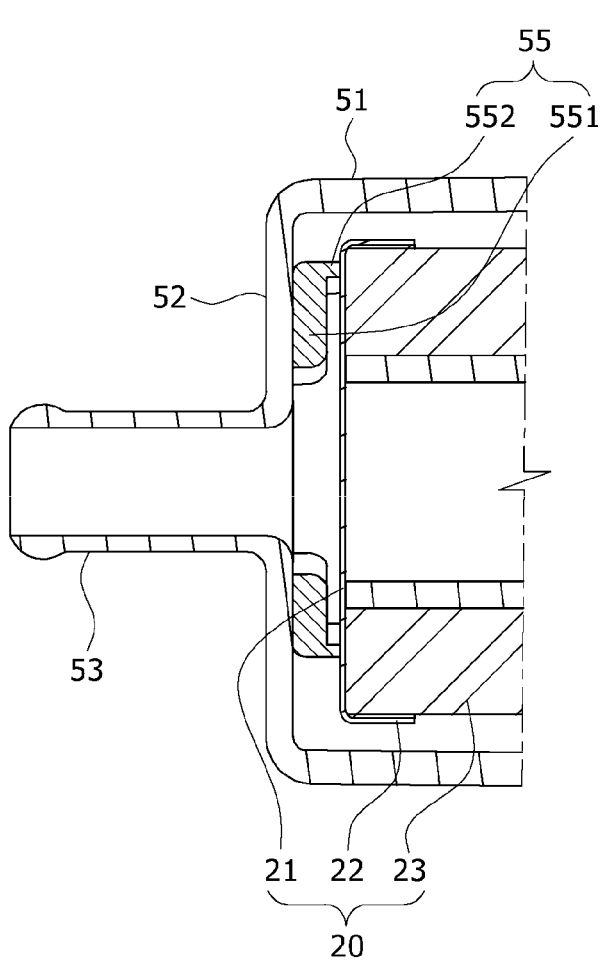
FIG. 4 is a cross-sectional view schematically illustrating the state in which the filter part is mounted on the housing part according to an embodiment of the present disclosure.

FIG. 4 is a cross-sectional view schematically illustrating the state in which the filter part is mounted on the housing part according to an embodiment of the present disclosure. Referring to FIGS. 3 and 4, the first guide portion 54 according to an embodiment of the present disclosure may include filter guide portions 55.

One or more filter guide portions 55 may protrude from the inner portion(s) of one or more of the first duct portion 51 and the first cover portion 52, and may guide seating of the filter part 20. For example, the filter guide portions 55 may include first filter guide portions 551 and second filter guide portions 552. A plurality of first filter guide portions 551 may radially protrude from inner portions of the first cover portion 52 to support the filter part 20. A plurality of second filter guide portions 552 may radially protrude from inner portions of the first duct portion 51 to support the filter part 20. Each of the first filter guide portions 551 may be connected to or disconnected from corresponding one of the second filter guide portions 552. The air may pass through spaces between the protruding first filter guide portions 551 and spaces between the protruding second filter guide portions 552. That is, the filter part 20 may include a disk-shaped first filter portion 21 configured to be seated on the first filter guide portions 551, a second filter portion 22 bent from the periphery of the first filter portion 21 to be in contact with the second filter guide portions 552, and a third filter portion 23 interposed between the first filter portion 21 and the second filter portion 22, with holes being formed in the central portion of the third filter portion 23 to remove foreign matter from the air passing therethrough.

Figure 5:
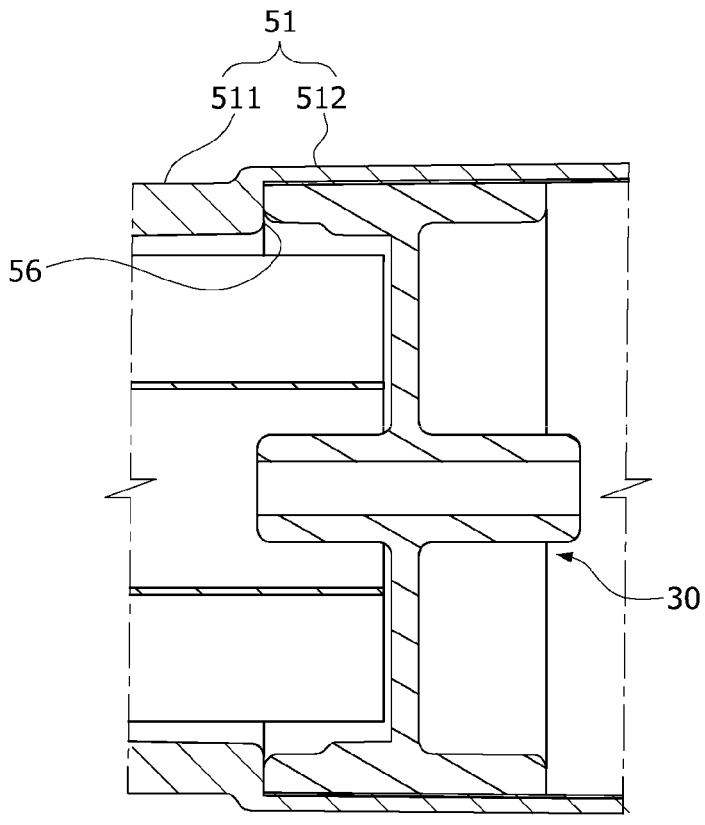
FIG. 5 is a cross-sectional view schematically illustrating the state in which the noise reducing part is mounted on the housing part according to an embodiment of the present disclosure.

FIG. 5 is a cross-sectional view schematically illustrating the state in which the noise reducing part is mounted on the housing part according to an embodiment of the present disclosure. Referring to FIGS. 3 and 5, the first guide portion 54 according to an embodiment of the present disclosure may include a noise reducer seating portion 56 and a noise reducer insertion portion 57.

The noise reducer seating portion 56 may protrude from the inner portion of the first duct portion 51, and may allow the noise reducing parts 30 to be seated thereon. For example, the first duct portion 51 may include a duct filter portion 511 allowing the filter part 20 to be disposed therein and a duct noise reducer portion 512 extending from the duct filter portion 511 and allowing the noise reducing parts 30 to be disposed therein. The duct filter portion 511 communicates with the first passage portion 53 and the inner diameter of the duct filter portion 511 is smaller than that of the duct noise reducer portion 512. Thus, the noise reducer seating portion 56 may be defined by the stepped portion between the duct filter portion 511 and the duct noise reducer portion 512.

The noise reducer insertion portion 57 is depressed into the first duct portion 51 to guide insertion of the noise reducing parts 30. For example, the reducer insertion portion 57 may be formed in the longitudinal direction of the duct noise reducer portion 512 to guide the noise reducing parts 30 to positions at which the noise reducing parts 30 are supposed to be inserted.

Figure 6:
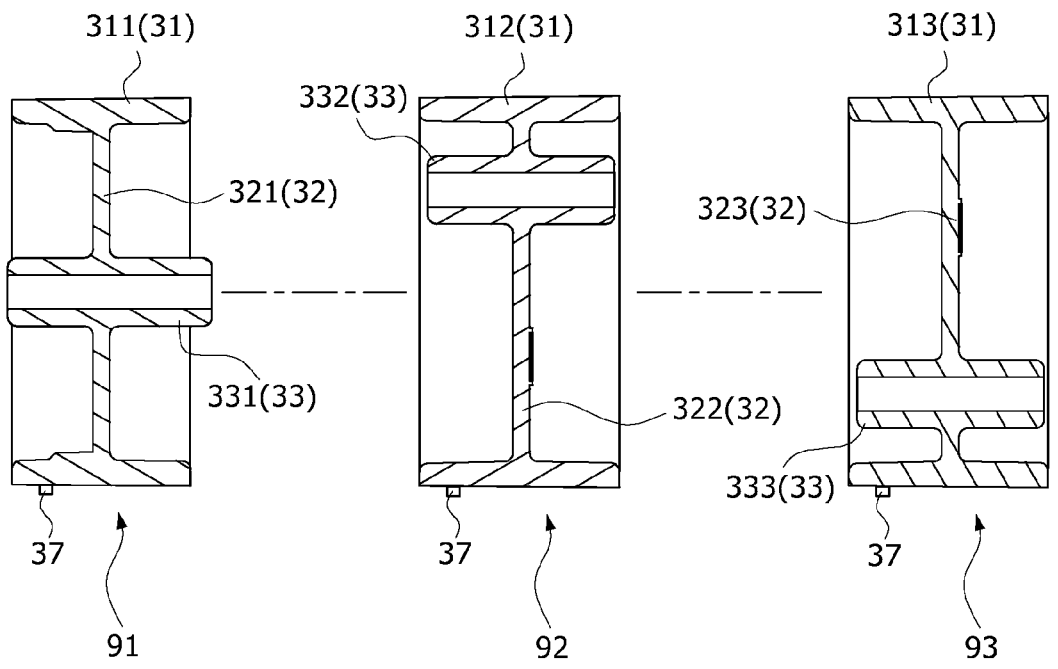
FIG. 6 is a cross-sectional view schematically illustrating the noise reducing parts according to an embodiment of the present disclosure.

FIG. 6 is a cross-sectional view schematically illustrating the noise reducing parts according to an embodiment of the present disclosure. Referring to FIGS. 2 and 6, each of the noise reducing parts 30 according to an embodiment of the present disclosure may include a reducer duct portion 31, a reducer cover portion 32, and a reducer passage portion 33.

The reducer duct portion 31 may be in close contact with the inner portion of the housing part 10. For example, the reducer duct portion 31 may have the shape of a cylinder to be in close contact with the inner portion of the duct noise reducer portion 512. Reducer protrusion portions 37 may be formed on the outer portions of the reducer duct portion 31. The reducer protrusion portions 37 may be configured to be inserted into the noise reducer insertion portion 57 and move along the noise reducer insertion portion 57.

The reducer cover portion 32 may cover the central portion of the reducer duct portion 31. For example, the reducer cover portion 32 may have the shape of a disk, and may be formed integrally with the inner circumferential surface of the reducer duct portion 31.

The reducer passage portion 33 may extend through the reducer cover portion 32 to allow the fluid to pass therethrough. For example, the reducer passage portion 33 may be formed integrally with the reducer cover portion 32 and protrude left or right from the reducer cover portion 32.

In addition, when a plurality of noise reducing parts 30 are disposed to be sequentially connected to each other, the reducer passage portions 33 provided in the noise reducing parts 30, respectively, may be disposed in a staggered arrangement so as to reduce air movement speed.

That is, the noise reducing parts 30 may include a first noise reducing portion 91, a second noise reducing portion 92, and a third noise reducing portion 93. The first noise reducing portion 91, the second noise reducing portion 92, and the third noise reducing portion 93 may be arranged in line.

The first noise reducing portion 91 may include a first noise reducer duct portion 311 configured to be in close contact with the inner portion of the housing part 10, a first noise reducer cover portion 321 covering the central portion of the first noise reducer duct portion 311, and a first noise reducer passage portion 331 extending through the first noise reducer cover portion 321 to allow the fluid to pass therethrough.

The second noise reducing portion 92 may include a second noise reducer duct portion 312 configured to be in close contact with the inner portion of the housing part 10, a second noise reducer cover portion 322 covering the central portion of the second noise reducer duct portion 312, and a second noise reducer passage portion 332 extending through the second noise reducer cover portion 322 to allow the fluid to pass therethrough.

The third noise reducing portion 93 may include a third noise reducer duct portion 313 configured to be in close contact with the inner portion of the housing part 10, a third noise reducer cover portion 323 covering the central portion of the third noise reducer duct portion 313, and a third noise reducer passage portion 333 extending through the third noise reducer cover portion 323 to allow the fluid to pass therethrough.

The first noise reducer duct portion 311 on which the first noise reducer cover portion 321 and the first noise reducer passage portion 331 are provided may be supported on the noise reducer seating portion 56. The second noise reducer duct portion 312 on which the second noise reducer cover portion 322 and the second noise reducer passage portion 332 are provided may be supported on the first noise reducer duct portion 311. The third noise reducer duct portion 313 on which the third noise reducer cover portion 323 and the third noise reducer passage portion 333 are provided may be supported on the second noise reducer duct portion 312. Here, the first noise reducer passage portion 331 may be formed in the central portion of the first noise reducer cover portion 321 and be inserted into the third filter portion 23 to guide the air. The second noise reducer passage portion 332 may be located at 12 o'clock with respect to the central portion of the second noise reducer cover portion 322 to guide the air. The third noise reducer passage portion 333 may be located at 6 o'clock with respect to the central portion of the third noise reducer cover portion 323 to guide the air.

The operation of the air filter for an air suspension having the above-described structure according to an embodiment of the present disclosure will be described as follows.

When the ambient air is supplied to the height control part 100 in order to raise the height of a vehicle, the ambient air is introduced to the first duct portion 51 through the first passage portion 53, and foreign matter is removed while the ambient air is passing through the filter part 20. The ambient air that has passed through the filter part 20 sequentially passes through the noise reducer passage portion 331, the second noise reducer passage portion 332, and the third noise reducer passage portion 333, during which air movement speed is reduced, thereby reducing noise. The ambient air that has passed through the third noise reducer passage portion 333 is moved to the height control part 100 through the hose 200.

In contrast, when the air is discharged from the height control part 100 to lower the height of the vehicle, the inside air passes through the hose 200 and then sequentially through the third noise reducer passage portion 333, the second noise reducer passage portion 332, and the first noise reducer passage portion 331, during which air movement speed is reduced, thereby reducing noise. The inside air that has passed through the first noise reducer passage portion 331 passes through the filter part 20 and then is discharged to the outside through the first passage portion 53.

In the air filter 1 for an air suspension according to an embodiment of the present disclosure, the filter part 20 and the noise reducing part 30 are disposed inside the housing part 10. Thus, it is possible to remove foreign matter from the air used in the height control part 100 and to reduce noise. In addition, since the filter part 20 and the noise reducing part 30 are disposed inside the housing part 10, the filter part 20, the noise reducing part 30, and the housing part may be fabricated into a single module, thereby reducing space in a vehicle body occupied thereby.

Although exemplary embodiments of the present disclosure have been disclosed for illustrative purposes, those skilled in the art will appreciate that various modifications, additions and substitutions are possible, without departing from the scope and spirit of the present disclosure as defined in the accompanying claims. Thus, the true technical scope of the present disclosure should be defined by the following claims.

What is claimed is:

1. An air filter for an air suspension, the air filter comprising:

a housing part configured to be mounted on a vehicle body, connected to a height control part that controls a height of a vehicle, and allowing fluid to pass therethrough;

a filter part disposed inside the housing part to remove foreign matter from the fluid; and one or more noise reducing parts disposed inside the housing part to reduce a movement speed of the fluid and reduce noise, wherein the housing part comprises:

a first housing part having one open side, allowing the filter part and the one or more noise reducing parts to be disposed therein, and allowing the fluid to pass therethrough;

a second housing part coupled to the first housing part to cover one side of the first housing part and connected to the height control part, and wherein the first housing part comprises:

a first duct portion having a duct shape and one end coupled to the second housing part;

a first cover portion covering the other end of the first duct portion;

a first passage portion in the first cover portion to guide the fluid; and a first guide portion in at least one of the first duct portion and the first cover portion to guide mounting of the filter part and the one or more noise reducing parts.

2. The air filter according to claim 1, wherein the first passage portion is configured to guide ambient air to the first duct portion or guide air from the first duct portion to outside.

3. The air filter according to claim 1, wherein the first guide portion comprises one or more filter guide portions protruding from an inner portion of at least one of the first duct portion and the first cover portion to guide seating of the filter part.

4. The air filter according to claim 3, wherein the filter guide portions are configured to protrude from or be depressed into inner surfaces of the first duct portion and the first cover portion.

5. The air filter according to claim 3, wherein the filter guide portions comprise:

a plurality of first filter guide portions radially protruding from inner portions of the first cover portion to support the filter part; and a plurality of second filter guide portions radially protruding from inner portions of the first duct portion to support the filter part.

6. The air filter according to claim 5, wherein the filter part comprises:

a disk-shaped first filter portion configured to be seated on the first filter guide portions;

a second filter portion bent from a peripheral portion of the first filter portion to be in contact with the second filter guide portions; and a third filter portion interposed between the first filter portion and the second filter portion to remove foreign matter from air passing therethrough.

7. The air filter according to claim 3, wherein the first guide portion comprises:

a noise reducer seating portion protruding from an inner portion of the first duct portion and allowing the one or more noise reducing parts to be seated thereon; and a noise reducer insertion portion depressed into the first duct portion to guide insertion of the one or more noise reducing parts.

8. The air filter according to claim 7, wherein the first duct portion comprises:

a duct filter portion allowing the filter part to be disposed therein; and a duct noise reducer portion extending from the duct filter portion and allowing the one or more noise reducing parts to be disposed therein.

9. The air filter according to claim 8, wherein an inner diameter of the duct filter portion is smaller than that of the duct noise reducer portion, whereby the noise reducer seating portion is defined by a stepped profile between the duct filter portion and the duct noise reducer portion.

10. The air filter according to claim 8, wherein the noise reducer insertion portion is along a longitudinal direction of the duct noise reducer portion to guide the one or more noise reducing parts to positions at which the one or more noise reducing parts are supposed to be inserted.

11. An air filter for an air suspension, the air filter comprising:

a housing part configured to be mounted on a vehicle body, connected to a height control part that controls a height of a vehicle, and allowing fluid to pass therethrough;

a filter part disposed inside the housing part to remove foreign matter from the fluid; and one or more noise reducing parts disposed inside the housing part to reduce a movement speed of the fluid and reduce noise, wherein each of the one or more noise reducing parts comprises:

a reducer duct portion configured to be in close contact with an inner portion of the housing part;

a reducer cover portion covering a central portion of the reducer duct portion; and a reducer passage portion extending through the reducer cover portion to allow the fluid to pass therethrough.

12. The air filter according to claim 11, wherein the reducer duct portion comprises reducer protrusion portions on an outer portion of the reducer duct portion, the reducer protrusion portions being configured to be inserted into and movable in the housing part.

13. The air filter according to claim 11, wherein two or more of the noise reducing parts are arranged in line, and the reducer passage portions in the two or more noise reducing parts, respectively, are disposed in a staggered arrangement.

14. An air filter for an air suspension, the air filter comprising:

a housing part configured to be mounted on a vehicle body, connected to a height control part that controls a height of a vehicle, and allowing fluid to pass therethrough;

a filter part disposed inside the housing part to remove foreign matter from the fluid; and noise reducing parts disposed inside the housing part and comprising a first noise reducing portion, a second noise reducing portion, and a third noise reducing portion arranged in line to reduce a movement speed of the fluid and reduce noise.

15. The air filter according to claim 14, wherein the first noise reducing portion comprises:

a first noise reducer duct portion configured to be in close contact with an inner portion of the housing part;

a first noise reducer cover portion covering a central portion of the first noise reducer duct portion; and a first noise reducer passage portion extending through the first noise reducer cover portion to allow the fluid to pass therethrough.

16. The air filter according to claim 15, wherein the second noise reducing portion comprises:

a second noise reducer duct portion configured to be in close contact with the inner portion of the housing part;

a second noise reducer cover portion covering a central portion of the second noise reducer duct portion; and a second noise reducer passage portion extending through the second noise reducer cover portion to allow the fluid to pass therethrough.

17. The air filter according to claim 16, wherein the third noise reducing portion comprises:

a third noise reducer duct portion configured to be in close contact with the inner portion of the housing part;

a third noise reducer cover portion covering a central portion of the third noise reducer duct portion; and a third noise reducer passage portion extending through the third noise reducer cover portion to allow the fluid to pass therethrough.

18. The air filter according to claim 17, wherein the first noise reducer passage portion is in a central portion of the first noise reducer cover portion, the second noise reducer passage portion is located at 12 o'clock with respect to a central portion of the second noise reducer cover portion, and the third noise reducer passage portion is located at 6 o'clock with respect to a central portion of the third noise reducer cover portion.

* * * * *